(12) United States Patent
Cohen et al.

(10) Patent No.: US 6,434,618 B1
(45) Date of Patent: Aug. 13, 2002

(54) PROGRAMMABLE NETWORK ELEMENT FOR PACKET-SWITCHED COMPUTER NETWORK

(75) Inventors: Ariel Cohen, Berkeley Heights; Sampath Rangarajan, Bridgewater, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/190,355

(22) Filed: Nov. 12, 1998

(51) Int. Cl.$^7$ .............................................. G06F 15/16
(52) U.S. Cl. ..................... 709/228; 709/201; 709/202; 709/227; 709/238; 370/400; 370/401
(58) Field of Search ................................ 709/200–203, 709/227–229, 236–238, 240–241, 313; 370/400–401; 713/200–202

(56) References Cited

U.S. PATENT DOCUMENTS

| | | | | |
|---|---|---|---|---|
| 5,819,031 A | * | 10/1998 | Iwamoto ..................... | 709/230 |
| 5,896,501 A | * | 4/1999 | Ikeda et al. ................. | 709/216 |
| 6,012,083 A | * | 1/2000 | Savitzky et al. ............ | 709/202 |
| 6,061,798 A | * | 5/2000 | Coley et al. ................ | 713/201 |
| 6,157,955 A | * | 12/2000 | Narad et al. ................ | 709/228 |
| 6,195,703 B1 | * | 2/2001 | Blumenau et al. .......... | 709/238 |
| 6,272,537 B1 | * | 8/2001 | Kekic et al. ................ | 709/223 |

OTHER PUBLICATIONS

D. L. Tennenhouse, J. M. Smith, W. D. Sincoskie, D. J. Wetherall, G. J. Minden, "A Survey of Active Network Research", *IEEE Communications Magazine*, vol. 35, No. 1, pp. 80–86, 1997.

K. Egevang and P Francis, "The IP Network Address Translator (NAT)", IETF RFC No. 1631, May, 1994.

Sonic WALL Internet Firewall, Overview, Sonic Home, 1998 Sonic Systems, Inc.

* cited by examiner

*Primary Examiner*—Bharat Barot
(74) *Attorney, Agent, or Firm*—Stephen M. Gurey

(57) ABSTRACT

A programmable network element (400) operates on packet traffic flowing through the element in accordance with a gateway program (404, 405, 406) which is dynamically uploaded into the network element or unloaded from it via a mechanism separate from the actual packet traffic as the element operates. Such programmable network element can simultaneously operate on plural packet flows with different or the same programs being applied to each flow. A dispatcher (402) provides a packet filter (403) with a set of rules provided by one or more of the dynamically loaded and invoked programs. These rules define, for each program, the characteristics of those packets flowing through the network element that are to be operated upon in some manner. A packet that flows from the network through the filter and satisfies one or more of such rules is sent by the packet filter to the dispatcher. The dispatcher, in accordance with one of the programs, either sends the packet to the program for manipulation by the program itself, or manipulates the packet itself in a manner instructed by the program. The processed packet is sent back through the filter to the network for routing to its destination.

51 Claims, 5 Drawing Sheets

PROGRAMMABLE NETWORK ELEMENT FOR PACKET-SWITCHED COMPUTER NETWORK

FIELD OF THE INVENTION

This invention relates to packet-switched computer networks, and more particularly, to an element in such a network that controls and/or manipulates packet traffic flowing through it in some predetermined programmed manner.

BACKGROUND OF THE INVENTION

In packet-switched computer networks routers perform the function of forwarding the packet traffic that flows through them. Routers generally implement standardized functions to enable them to interact with other routers on the network. Routers are currently available that perform specialized functions in addition to routing, such as load balancing, web caching, encryption and fault tolerance. Layer 4 switches, for example, are available that can make decisions about packet forwarding based on TCP/UDP headers as well as IP headers. Such switches also may sometimes be augmented with capabilities such as load balancing. Network address translators are also available for connecting a number of computers on a private network with unadvertised IP addresses to the Internet (see, e.g., K. Egerang and P. Francis, "The IP Network Address Translator (NAT)", IETF RFC No. 1631, 1994; and the SonicWALL product from Sonic Systems, Inc., http://www.sonicsys.com). Such prior art routers are special function "boxes" that are designed to perform the specific function required. Such special function routers perform their specific function by means of software or hardware within their structure and are thus only able to perform the function for which they have been designed.

In the research community the term "active networking" has been coined to refer to the type of networking in which programmable routers are incorporated in the network. Such programmable routers would provide the standard router functionality and, in addition, execute programs which manipulate the packets passing through the router. As envisioned, the programs to be executed in the router would be contained in the normal traffic that passes through the router; i.e., packets (called "capsules") containing programs with embedded data are sent through the network instead of the standard data programs (see, e.g., D. L. Tennenhouse, J. M. Smith, W. D. Sincoskie, D. J. Wetherall, G. J. Minden, "A Survey of Active Network Research", IEEE Communications Magazine, Vol. 35, no. 1, pp. 80-86, 1997). Since programmable routers must coexist with non-programmable routers in the network, capsules must be tunneled through the non-programmable routers which cannot execute them. Active networking is motivated by goals such as: having specialized network support for particular applications (e.g., application-level Quality of Service [QoS]), introducing new protocols, performing caching in network nodes, and, in general, being able to add any desirable new functionality that may be helpful for emerging new uses of networks where the routers are the natural location to incorporate such new functionality. Designing such programmable routers as described above must by necessity encompass work in many areas such as OS support, programming languages and execution environments for the router programs, security, protocols, interoperability with the non-programmable routers, etc. Disadvantageously, such an approach requires significant interoperability between these many elements and can not be applied to standard packet network traffic without modifications. Until such time at which a network consists entirely of such general programmable routers, support of such applications will be difficult.

SUMMARY OF THE INVENTION

In accordance with the present invention, a programmable network element operates on standardized packet traffic passing through the network element in accordance with a program which is dynamically uploaded into the network element or unloaded from it via a mechanism separate from the actual packet traffic as the element operates. Such programmable network element is capable of simultaneously operating on plural packet flows with different or the same programs being applied to each flow. Each program applies a user definable set of processing rules to those packets flowing through the element that satisfy packet criteria defined by the program. Further, the network element operates on standardized IP packet traffic that does not have to be modified to enable the functionalities of the network element to be invoked. Even further, the network element is transparent to the endpoints of the connection, thus requiring no modification at the endpoints or in the packet data transmitted from or to them. The programmable network element of the present invention can be positioned in a network as a router, or can sit at the edge of a network between one or more Local Area Networks (LANs) and the rest of the network, or at the edge between an internal network and an external one. The network element scan be located at the edge between server farms (such as FTP or HTTP servers) and the rest of the network. The programmable network element could serve as a "virtual server" anywhere on the network. Further, the network element could also be incorporated as software on servers or clients, in the latter acting as a gateway between an application and the network. Even further, the programmable network element of the present invention could be placed as a combination of the above.

The embodiment of the present invention described below consists of a number of processes running on a Linux Operating System (OS). A dispatcher process provides a packet filter in the Linux kernel with a set of rules provided by one or more dynamically loaded and invoked programs. These rules define, for each program, the characteristics of those packets flowing through the network element that are to be operated upon in some manner by the network element. A packet that then flows from the network through the packet filter and satisfies one or more of such rules is sent by the packet filter to the dispatcher process. The dispatcher process then, in accordance with one of the dynamically loaded and invoked programs with which it is interacting, either sends such a packet to the program for processing by the program itself, or itself acts upon the packet in a manner as instructed by the program. The processed packet is then sent back to the kernel through the packet filter and onto the network for routing to its intended destination. Each program itself is dynamically registered with the dispatcher process either locally from a local program injector by an administrator of the network element using usual OS mechanisms for invoking programs, or over the network from a remote program injector.

DETAILED DESCRIPTION

Figure 1:
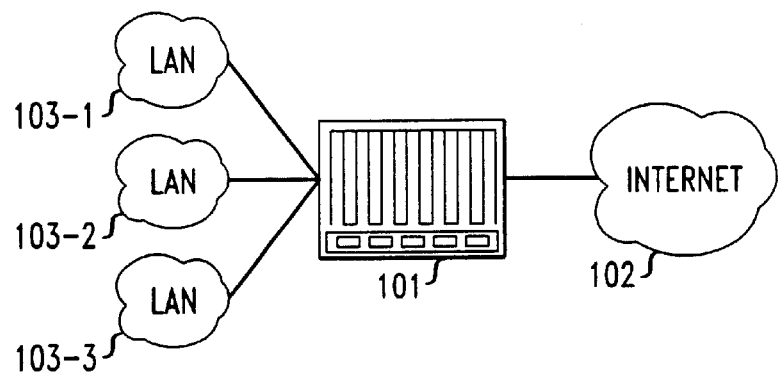
FIG. 1 is a block diagram showing the programmable network element of the present invention positioned at the edge of a network connected to a plurality of LANs.
Figure 2:
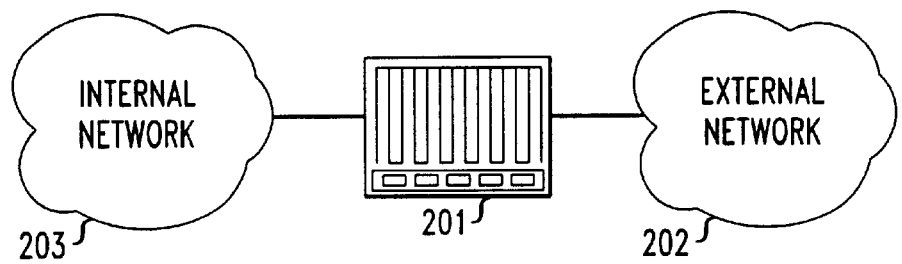
FIG. 2 is a block diagram showing the programmable network element of the present invention positioned at the edge of a network connected to an internal network.
Figure 3:
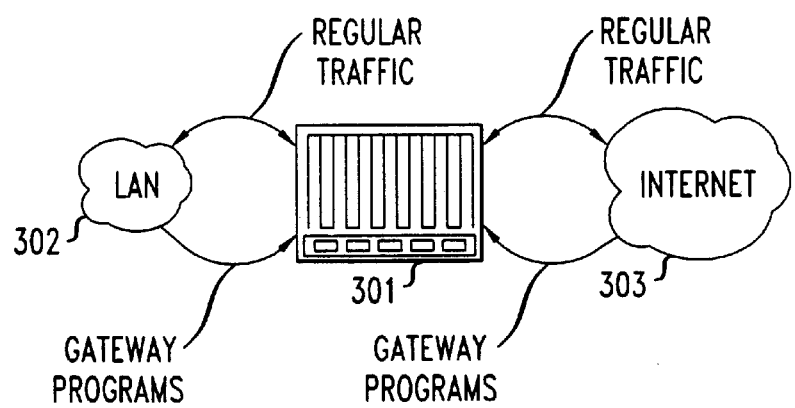
FIG. 3 is a block diagram showing the programmable network element of the present invention receiving regular network traffic and gateway programs as separate mechanism.

As will be described in detail herein, the programmable network element of the present invention will be assumed, for illustrative purposes only, to be positioned at the edge of an IP network, such as the Internet, and will be referred to hereinafter as a programmable gateway. It should be emphasized, however, that reference to the programmable network element as a programmable gateway is not intended to limit the positioning and functioning of the present invention to such a location and function. With reference to FIG. 1, the programmable gateway 101 is shown positioned sitting at the edge of the Wide Area Network (WAN), the Internet 102, and a plurality of LANs 103-1,103-2 and 103-3. FIG. 2 shows the programmable gateway 201 sifting at the edge of an external network 202, such as the Internet, and an internal network 203. In accordance with the present invention as shown in FIG. 3, the programmable gateway 301 manipulates the traffic directed to it from the LAN 302 and the Internet 303 in a manner separate from the gateway programs that may be directed to it from the LAN and/or gateway. The programmable gateway thus receives, manipulates and forwards traffic in the same manner as a non-programmable router, with a separate mechanism existing for uploading programs into the programmable gateway either locally or over the network.

In accordance with the present invention, the programmable gateway can be dynamically programmed to simultaneously perform multiple functions on the packets traversing through it. As will be described, once a packet flowing through the gateway fires a rule associated with one of the programs that have been loaded and invoked on the gateway, that packet is manipulated in a particular manner that is determined by the program associated with the fired rule. Such packet manipulation can include encrypting or decrypting the payload of the packet, translating the destination address of the packet to an alternate address, as well as other functionalities associated with the program. A packet causes a rule to fire based on one or more packet characteristics that the packet is determined to possess by filtering the information contained in the packet header, the packet payload, or some predetermined combination of both. Examples of such characteristics include a packet source or destination address or a range of addresses, source or destination ports, protocols such as TCP or UDP, TCP/UDP header information. With multiple programs loaded into the programmable gateway, these multiple programs can execute in parallel on different packet flows, or they may execute in succession on a single packet flow. With such multiple and concurrent functionalities, the programmable gateway can function as a Layer 4 switch that will make decisions about packet forwarding to different server farms based on TCP/UDP headers and IP header. Further examples of the functionalities that can be performed include network address translation for connecting a number of computers to the Internet when only one IP address is available, firewall protection, encrypting and decrypting packet payload to ensure secure communication between LANs, and web dispatching for load balancing and fault tolerance purposes.

Figure 4:
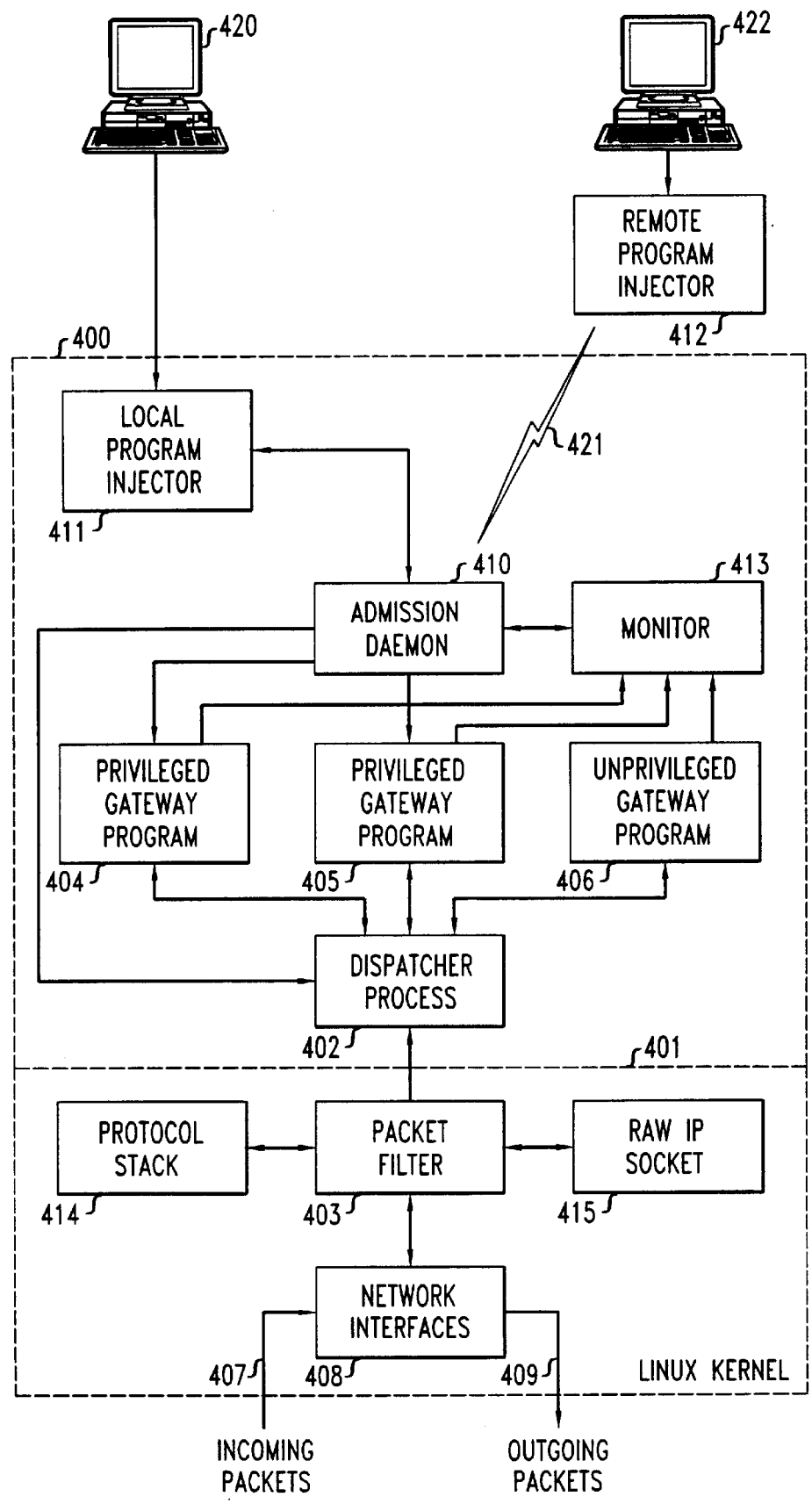
FIG. 4 is a block diagram of an embodiment of the programmable network element of the present invention showing its component processes.

FIG. 4 is a block diagram that shows the programmable gateway 400 of the present invention, which is embodied as a number of processes running on a Linux OS. In FIG. 4, the processes below dotted line 401 within gateway 400 represent processes within the Linux kernel. In brief, a dispatcher process 402 uses the packet filter process 403 in the Linux kernel to obtain packets requested by any of the gateway programs 404, 405 and 406. The dispatcher process 402 is the only process which interacts with the packet filter process 403. It is responsible for sending incoming packets on the input 407 of network interfaces 408 to the particular gateway program or programs that wish to process them, if any, and for sending the processed packets back to the kernel. If, on the other hand, an incoming packet does not fire any rule and is not passed by the packet filter process 403 to the dispatcher process 402 for processing in accordance with any of the gateway programs, the incoming packet is passed to the protocol stack 414 within the kernel. The packet is there processed in a normal manner and is passed back through the packet filter 403 for output onto the network through the network interfaces 408 to output 409 for routing to its intended destination without any manipulation of any of its header or payload information by any gateway program. For a packet that does fire a rule, once that packet is manipulated in the manner determined by the gateway program associated with the fired rule, the manipulated packet is passed by the dispatcher process 402 to the raw IP socket 415, which sits in the protocol stack. The manipulated packet is then passed back through packet filter 403 to the network interfaces 408 onto output 409 for routing to the destination address indicated in its header, which address may have been manipulated in accordance with one of the gateway programs.

The gateway programs 404, 405 and 406 are registered with the dispatcher process 402 and spawned by the admission daemon 410. The admission daemon receives programs either locally from the local program injector 411, or over the network from a remote program injector 412. A monitor process 413 monitors various properties of the running gateway programs such as their memory and CPU usage. Under certain conditions, the monitor process 413 may request the admission daemon 410 to terminate one or more gateway programs.

The gateway programs 404, 405 and 406 are classified as being either privileged programs, such as programs 404 and 405, and unprivileged programs, such as program 406. A privileged program is allowed to intercept and inject back into the network any packet, while an unprivileged program is only allowed to intercept and inject packets which satisfy certain conditions. Locally injected programs are privileged, while programs which are injected remotely are unprivileged. A gateway program that performs network address translation for plural PCs that share the same IP address, that performs firewall functions, that encrypts/decrypts packets as they pass between a LAN and the Internet, and that functions as a web load balancer are examples of programs that need to be privileged. A program that is injected by one computer to divert all packets directed to it to another computer, on the other hand, is an example of a gateway program that would be unprivileged.

Gateway programs can be initiated from the console 420 local to the programmable gateway by invoking the local program injector 411. As noted, all such gateway programs are privileged. The local program injector asks the admission daemon 410 to fork the process which will run the gateway program. Local program injector 411 also responds to inquiries about the status of a gateway program and to requests via the console 420, or otherwise, to terminate a gateway program. It communicates with admission daemon 410, which in turn communicates with the dispatcher process 402 and the monitor process 413 to perform these functions.

The remote program injector 412 runs on a remote machine. It transfers a program to be injected to the admission daemon 410 in the gateway over a TCP connection 421 via a console 422 associated with the remote machine. As noted, all such programs are unprivileged. Similarly to the local program injector 411, remote program injector 412 also responds to status and termination requests, with only requests involving programs injected by the requesting remote injector being satisfied.

Admission daemon 410 starts the execution of both locally injected and remotely injected gateway programs. Each gateway program 404, 405 and 406 is registered with the dispatcher process 402 by admission daemon 410, which also informs the dispatcher process 402 of the privilege level of the program. Admission daemon 410 also registers each gateway program with the monitor process 413. The monitor process 413 informs admission daemon 410 of important events relating to each running gateway program such as a program-initiated termination. It has the capability to request admission daemon 410 to terminate programs which exceed certain usage thresholds, such as CPU time or memory usage, and also responds to status requests sent by admission daemon 410. In the case of termination of a gateway program, either program-initiated via the monitor process 413 or via the local or remote program injectors 411 and 412, respectively, the admission daemon 410 notifies the dispatcher process 402. The admission daemon 410 also handles status requests from the local and remote program injectors.

The dispatcher process 402 manages the packet traffic between the kernel and the gateway programs 404, 405 and 406. Once a gateway program is initiated by the admission daemon 410, it requests the dispatcher to send it all packets that satisfy certain properties or rules, such as conditions on the source address, destination address, or TCP ports. The dispatcher process verifies that access to such packets is within the privilege level of the requesting gateway program and proceeds to request such packets from packet filter 403. Once such packets are received, they are sent to the requesting program. As previously noted, dispatcher process 402 also sends packets it receives from gateway programs to raw IP socket 415. Packets obtained from a gateway program are checked by the dispatcher process 402 to verify that they satisfy the constraints of the original gateway program as defined by its privilege level and other properties such as the IP address of the program's injector.

A gateway program may specify that it wishes to receive only packet headers. In this case, the dispatcher process 402 buffers the packet bodies corresponding to the headers, and attaches headers received from the gateway program to their corresponding packet bodies before the packets are sent to the raw IP socket 415. Advantageously, this decreases the size of messages which are transferred between a gateway program and the dispatcher process 402, thus reducing the message-passing overhead when a gateway programs does not need to examine or modify the packet's payload. Further reduction in the size of messages which are transferred are achieved by certain gateway programs that instruct the dispatcher process itself to perform specific functionalities rather than having these same functionalities performed within a gateway program. For example, packets can be filtered in accordance with whether they contain a specific flag, such as the SYN flag, in the packet header. This flag, as is well known, marks a packet a being part of a TCP connection establishment protocol rather than a data packet for a particular connection. After receiving packets containing the SYN flag, the gateway program can determine, for example, an address translation that needs to be performed for packets associated with that connection. Rather than perform that address translation itself on each data containing packet not containing the SYN flag, which would require at least the IP header and possibly the TCP header of each such data packet to be forwarded from the dispatcher process 402 to the gateway program that performs that function, the gateway program can provide instructions to the dispatcher process 402 to perform (within the dispatcher process 402) the address translation on packets associated with that particular connection. Advantageously, the message-passing overhead between the dispatcher process 402 and the gateway program is reduced. Even further, such processing can often be performed faster by the dispatcher process 402, which in embodiments other than the one described herein, can be implemented in faster-processing hardware rather than in software.

A gateway program is formulated by the programmer as programmer written code which defines the desired packet manipulation functionality that the programmer wishes that particular gateway program to implement. The program includes calls to predefined functions for purposes of communicating with the dispatcher process. In addition, the programs use predefined data structures for the purpose of passing information between the dispatcher process and the gateway program. These predefined functions and data structures reside in a library which is linked with the gateway programs during compilation of the program. The data structures, in addition to being known to each gateway program are also known to the dispatcher process 402. Each of plural data structures defines a template for information to be passed between a gateway program and the dispatcher process, which template is filled with data associated with the packet by either the gateway program or the dispatcher process depending upon whether the gateway program wants to communicate information to the dispatcher process or the dispatcher process wants to communicate information to the gateway program. Table 1 below is an example of a file, disp.h, containing constants and data structures that are used with the functions to be described later.

TABLE 1 disp.h

```
ifndef DISP_H define DISP_H include <sys/types.h> define PUBLIC_FILE "/tmp/sock/public_socket"
define MAX_PKT_LEN  65535
#define MAX_HDR_LEN  120
#define MAX_PKT_BUF  256
#define FLOW_START   'F'
#define FLOW_STOP    'S'
```

TABLE 1-continued disp.h

```
#define IP_PKT        'I'
#define PKT_HDR       'H'
#define INPUT         0
#define FORWARD       1
#define OUTPUT        2
struct flow_desig_s {
    __u32 src;
    __u32 src_mask;
    __u16 src_ports[2];
    __u32 dst;
    __u32 dst_mask;
    __u16 dst_ports[2];
    __u16 protocol;
    __u16 inv_flgs;
    __u32 mark;
    char type;
    char hdr_only;
};
struct pkt_msg_s {
    char msg_type;
    __u32 mark;
    __u16 pkt_len;
    char pkt[MAX_PKT_LEN];
};
struct hdr_msg_s {
    char msg_type;
    __u32 id;
    __u32 mark;
    char changed;
    char drop;
    unsigned short ip_hdr_len;
    unsigned short tcpudp_hdr_len;
    unsigned short tot_hdr_len;
    char hdr[MAX_HDR_LEN];
};
#define PKT_MSG_S_SIZE sizeof(struct pkt_msg_s)
#define HDR_MSG_S_SIZE sizeof(struct hdr_msg_s)
#define FLOW_DESIG_S_SIZE sizeof(struct flow_desig_s)
#define FLOW_S_SIZE sizeof(struct flow_msg_s)
#endif
```

In this file, disp.h, the constants and data structures are defined as follows:

Constants

PUBLIC_FILE: the path to the socket file used by the gateway programs to send messages to the dispatcher process.

MAX_PKT_BUF: the maximum number of packets which can be buffered for each gateway program when the gateway program asks for packet headers only (and thus packet bodies need to be buffered by the dispatcher for a while).

Other constants are described below in conjunction with the data structures.

Data Structures flow_desig_s: describes the properties of a packet flow requested by a gateway program.

src, src_mask, and src_ports contain the source IP address, address mask designating the significant bits, and source TCP/UDP port range for the packet flow, dst, dst_mask, and dst_ports similarly describe the destination IP address, address mask, and destination ports.

protocol specifies the IP protocol.

inv_flgs contains the logical or of flags which specify which of the flow properties should be inverted (for example, for a request of all packets which do not come from the specified port range.) The following flags can be used: IP_FW_INV_SRCIP (invert the meaning of the source IP address/mask fields), IP_FW_INV_DSTIP (invert the meaning of the destination IP address/mask), IP_FW_INV_SRCPT (invert the meaning of the source ports field), IP_FW_INV_DSTPT (invert the meaning of the destination ports field), IP_FW_INV_PROTO (invert protocol).

mark lets the gateway program assign marks to packet flows so that it can distinguish between packets belonging to different flows just by looking at the marks included with the packets it receives from the dispatcher process (packets will carry the mark assigned to the flow to which they belong.) Only the low 24 bits of this value are used.

type can be set to one of three values: INPUT, FORWARD, or OUTPUT. It is usually set to INPUT. This value determines the stage in the Linux firewall operation when the packets belonging to the flow will be intercepted.

hdr_only should be set to zero if the gateway program wishes to receive the payload of the packets as well as the headers, or one if only the headers are requested.

pkt_msg_s: this is the message type for messages containing entire packets (including payload). Messages of this type carry the packets transferred from the dispatcher to the gateway programs, and from the gateway programs to the dispatcher. The gateway programs are responsible for recomputing the TCP/UDP checksum if needed.

msg_type contains IP_PKT.

mark contains the mark associated with the flow to which this packet belongs. This mark is declared by the gateway program when it requests a packet flow from the dispatcher (see the description of flow_desig_s above). This field is ignored for packets sent from the gateway programs to the dispatcher; it is meaningful only for packets flowing from the dispatcher to the gateway programs.

pkt_len is the total length in bytes of the packet which appears in the pkt field. This field is ignored for packets flowing from the gateway programs to the dispatcher (the dispatcher discovers the packet length by looking at the packet itself.)

pkt is the IP packet (including headers and payload).

hdr_msg_s is similar to pkt_msg_s. This message type is used for messages carrying packet headers from the dispatcher to the gateway programs, and vice versa.

msg_type contains PKT_HDR.

id is a unique identifier assigned to the packet header by the dispatcher. When a gateway program sends a packet header back to the dispatcher, its identifier must remain the original identifier assigned to it by the dispatcher. The dispatcher needs this identifier in order to be able to associate the packet header with the packet payload which is buffered by the dispatcher.

mark is similar to the mark used in pkt_msg_s described above.

changed is only relevant to headers sent from the gateway programs to the dispatcher. It specifies whether the gateway program changed the header before it sent it back to the dispatcher (changed=1), or not (changed=0). The dispatcher uses this value when deciding whether there is a need to recompute the TCP/UDP checksum or not. In the case of passing entire packets, the gateway program is responsible for TCP/UDP checksum computations (hence this field does not appear in pkt_msg_s). When only headers are passed, the payload is not available to the gateway programs, so the dispatcher has to perform any needed TCP/UDP checksum computations.

drop specifies whether the gateway program wants to drop the packet associated with the header (drop=1), or send it out (drop=0). When entire packets are passed between the dispatcher and the gateway programs, this field is not needed (hence it does not appear in pkt_msg_s) since a drop results when the gateway program never sends the packet back to the dispatcher. In the case where only headers are passed, a drop needs to be specified explicitly. Otherwise, the dispatcher will not know that it can remove the corresponding packet payload from its buffer. This field is only relevant for headers flowing from the gateway programs to the dispatcher.

ip_hdr_len, tcpupd_hdr_len, and tot_hdr_len contain the IP header length, TCP/UDP header length, and total header length, respectively. These values are assigned by dispatcher for the headers it sends to the gateway programs. These fields are ignored by the dispatcher for headers sent to it by the gateway programs.

hdr contains the header itself.

Other data structures can be defined by those skilled in the art for specifying operations to be performed on packets within the dispatcher process 402 such as a data structure for specifying an address translation; a data structure for specifying TCP sequence number translations needed in case of payload changes; and a data structure for TCP window size translations needed for bandwidth management. These data structures are used by a gateway program to give instructions to the dispatcher process 402 and to pass packets and packet headers between the gateway program and the dispatcher process.

Functions are part of the library called by a gateway program to operate on the data structure in a manner desired by the programmer of the gateway program. Operations of these functions include initialization; passing information between the gateway program and the dispatcher process; specifying instructions that the dispatcher is to perform; and termination of the program. Examples of such functions are as follows:

int gwp_init( )

Initializes the gateway program by opening a log file, specifying signal handlers, and opening any needed interprocess communication facilities int gwp_start_flow(struct flow_desig_s *)

This function is used by the gateway program when it wishes to request a new packet flow from the dispatcher. The parameter specifies the properties of the packet flow as previously described for flow_desig_s.

int gwp_stop_flow(struct flow_desig_s *)

Stops receiving packets belonging to the specified flow.

int gwp_recv(void *, int)

Receives a packet (pkt_msg_s) or a packet header (hdr_msg_s) from the dispatcher process. The first parameter specifies the location for the packet or packet header, and the second parameter specifies the maximum number of bytes to be put there. The function returns the actual number of bytes received upon success, or −1 upon failure.

int gwp_send(void *, int)

Sends a packet (pkt_msg_s), packet header (hdr_msg_s), or flow start or stop request (flow_msg_s) to the dispatcher. Returns 0 for success, −1 for failure.

void gwp_norm_term(void)

Closes the log file and any open sockets and performs an exit (0).

void gwp_abnorm_term (void)

Closes the log file and any open sockets and performs an exit (1).

Other functions can be used to specify instructions to the dispatcher process for operating upon a packet within the specified packet flows. These additional functions include: a function for specifying address translations to be performed within the dispatcher process; a function for specifying TCP sequence number translations; and a function for specifying TCP window size changes. Functions to perform address translation would be used by a gateway programs that performs packet redirection. Functions to perform TCP sequence number changes would be used by gateway programs that perform packet payload modifications so that the payload modification is transparent to the endpoints of the connection. Both TCP sequence numbers and TCP acknowledgement sequence numbers will be modified per TCP connection. Functions to perform TCP window size changes can be used by gateway programs for throttling the bandwidth of TCP connections for the purpose of bandwidth management.

Further functions and data structures can be used which are related to the ability of the dispatcher process to carry out the processing of packets in accordance with instructions from the gateway programs. These functions and data structures are needed in cases where a gateway program wishes to receive occasional feedback from the dispatcher process about the current state of the packet flow through the dispatcher process. Gateway programs may use such feedback to make decisions about changing the instructions to the dispatcher process regarding packet processing within the dispatcher itself. Such feedback may include the number of active TCP connections to a server or network traffic statistics and measurements such as the currently observed latency or bandwidth of active TCP connections. Based on such feedback, gateway programs may decide to instruct the dispatcher process to modify the address translations or TCP window size changes performed by the dispatcher as a result of prior instructions from the gateway programs. Gateway programs may also use this feedback to adapt the processing they perform to current network conditions.

A programmer skilled in the art would write a gateway program to perform specific tasks that the gateway program is to perform using the functions and data structures provided by the library, plus code specific to the particular packet manipulation that that gateway program is to perform. The resultant process defined by the set of functions and data structures and program specific code that comprise the totality of the program is executed as a gateway program on the programmable gateway in the manner previously noted via the local program injector 411 or remote program injector 412.

Figure 5:
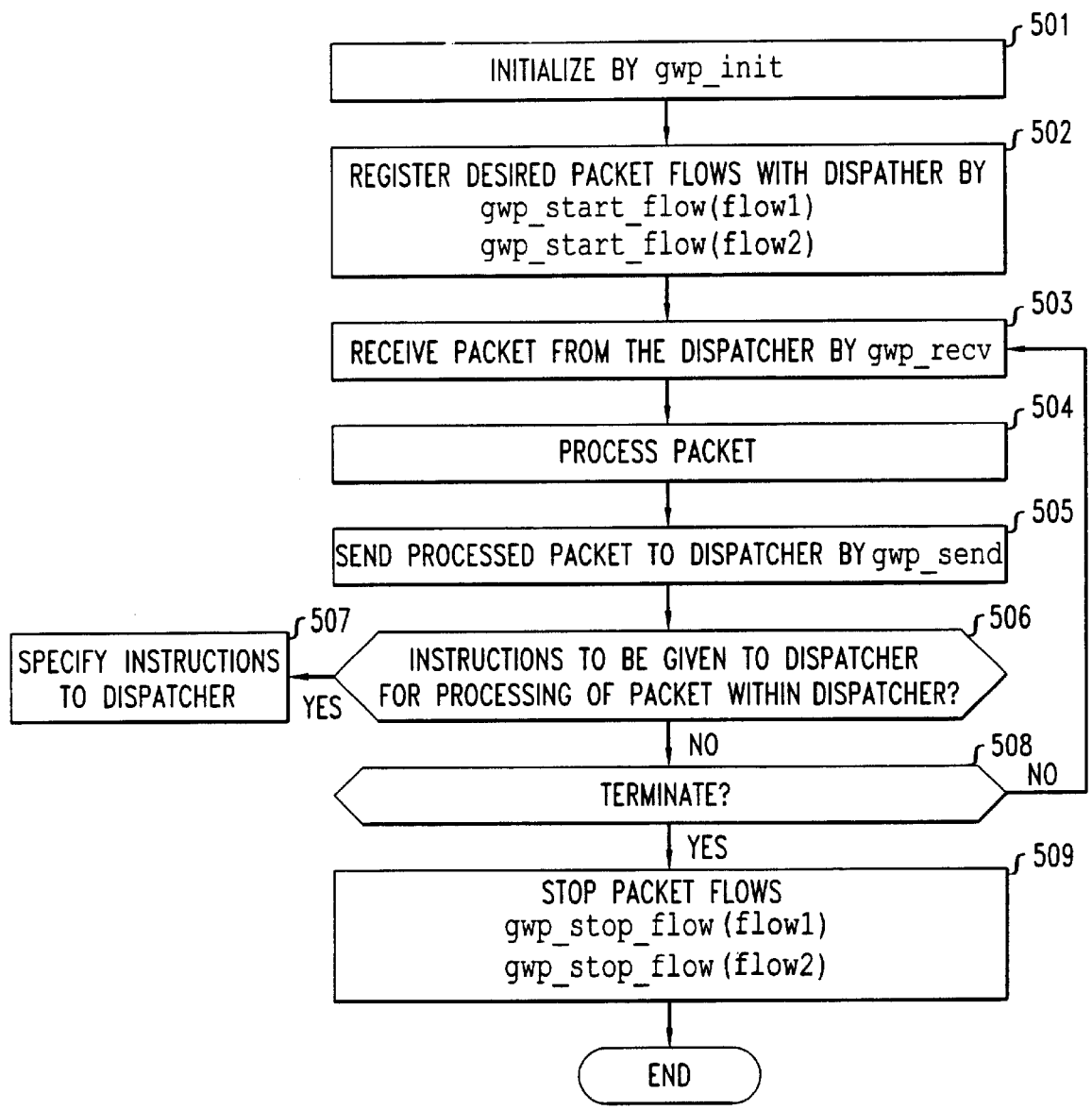
FIG. 5 is a flowchart showing the operation of a gateway program within the programmable network element of FIG. 5.

FIG. 5 is a flowchart that illustrates the functioning of a generic gateway program in the programmable gateway of the present invention. At step 501 program is initialized with the function gwp_nit, which initializes the data structures. At step 502 the sets of characteristics of the desired packet flows, flow1, flow2, etc., for the program are registered with the dispatcher process with the functions gwp_start_flow (flow1), gwp_start_flow (flow2), etc. At step 503, a packet satisfying one of the sets of characteristics is received from the dispatcher process with the function gwp_recv. The packet is then processed by the gateway program at step 504 in accordance with code that defines the packet manipulation to be performed. At step 505, the processed packet is sent to the dispatcher process by the function gwp_send. At step 506, a decision is made whether instructions are to be given to the dispatcher process for further particular processing by the dispatcher process itself of subsequent packets associated with the particular data flow. If the particular processing to be performed is the type that can be performed by dispatcher (address translation, TCP sequence number translation, or TCP window size translation) and the decision at step 506 is yes, at step 507, instructions are provided to the dispatcher process using the available function calls for such address translation, TCP sequence number translation, and/or TCP window size translation. The gateway program then returns to step 503 to await a later packet from the dispatcher from the same or a different packet flow. If instructions are not to be given to the dispatcher at step 506, then at step 508 a decision is made as to whether the end of all packet flows requested by the gateway program has been reached. If no, the gateway program returns to step 503 to await the next packet in one of the requested packet flows. If yes, then at step 509 the packet flows are stopped using the function calls gwp_stop_flow (flow1), gwp_stop_flow (flow2), etc., for each of the packet flows. The gateway program then terminates at step 510.

Figure 6:
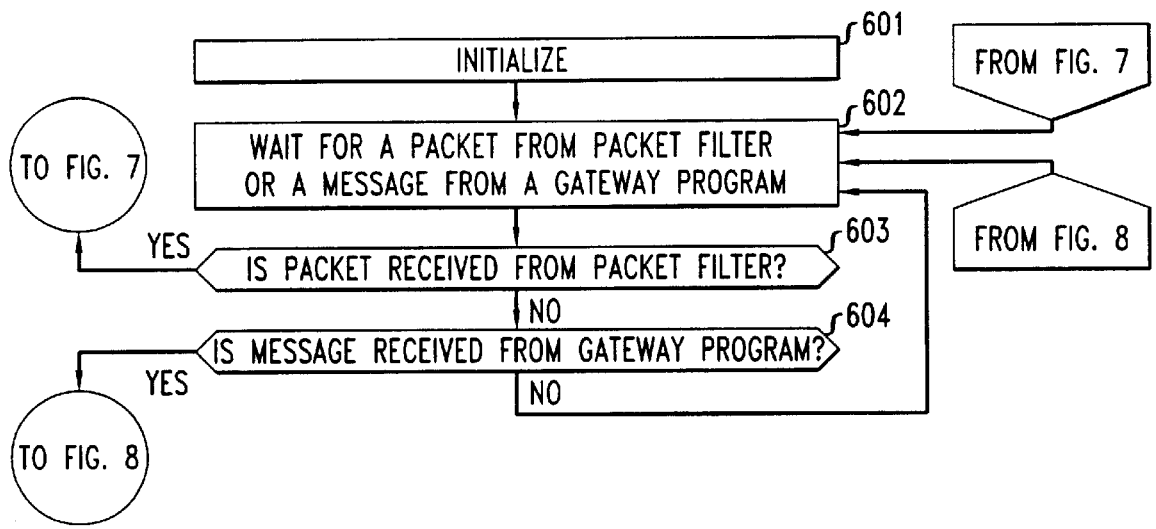
FIGS. 6, 7 and 8 together are a flowchart showing the operation of a dispatcher process within the programmable network element of FIG. 4.
Figure 7:
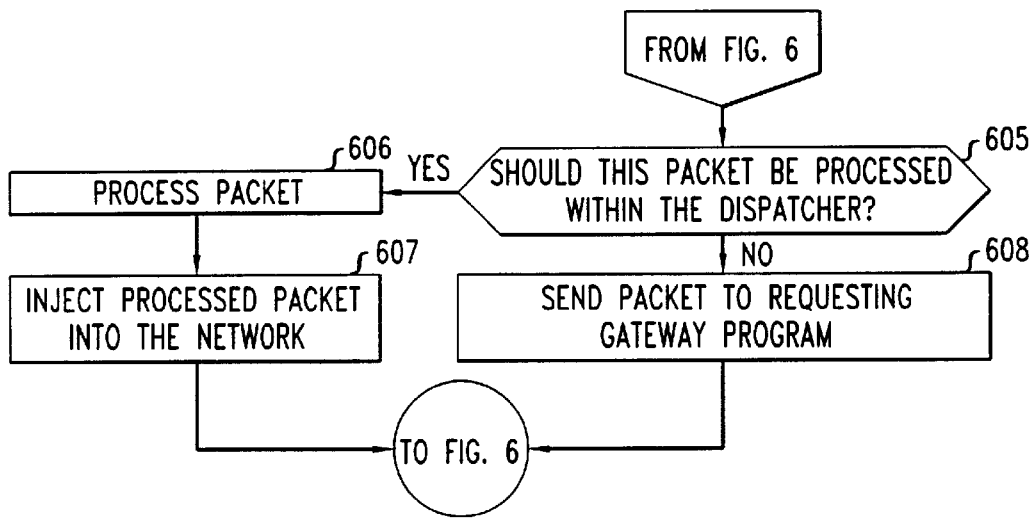
Figure 8:
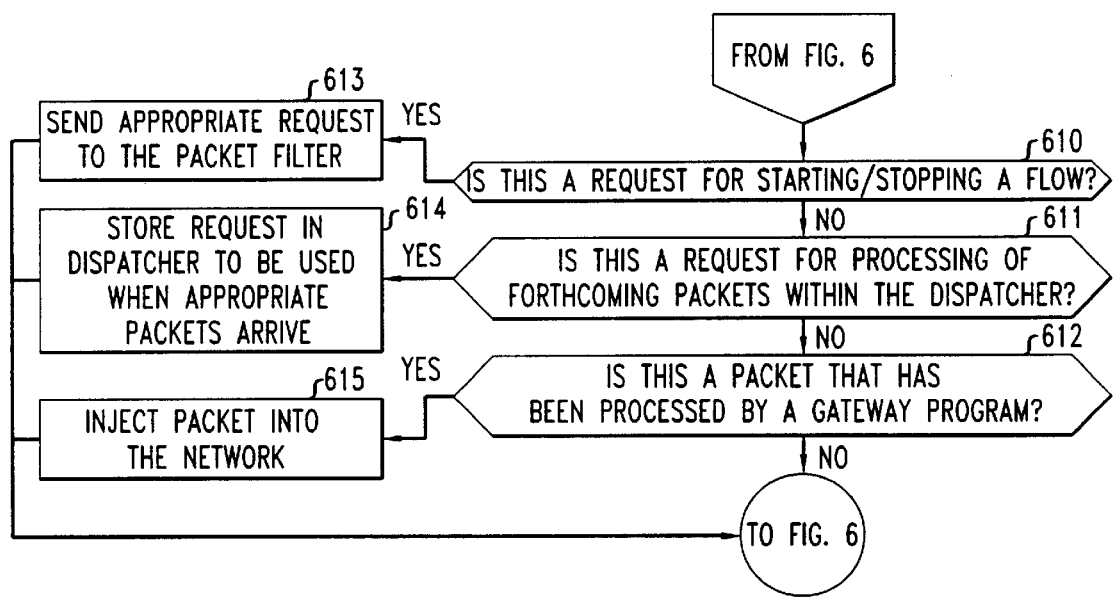

FIGS. 6, 7 and 8 together are a flowchart illustrating the operation of the dispatcher process 402 as it interacts with a gateway program. At step 601, data structures are initialized as are inter-process communication mechanisms between the dispatcher process and the gateway programs. At step 602, the dispatcher process waits for a packet from the packet filter 403 or a message from a gateway program. At decision step 603, a determination of whether a packet is received is made. If yes, a determination is made at step 605 whether this just received packet should be processed within the dispatcher process. This determination is made dependent upon whether instructions had previously been sent to the dispatcher process about processing forthcoming packets in a particular flow in the dispatcher itself. Such processing is limited to address translation, TCP sequence number translation, and TCP window size translations. If it is determined at step 605 that that there are no instructions for processing this packet within the dispatcher process itself, then, at step 608, the dispatcher process sends the packet to the requesting gateway program for processing. If, on the other hand, this packet is to be processed by the dispatcher process, it is processed at step 606, and, at step 607, the processed packet is sent to the raw IP socket for injection into the network. After alternative steps 607 or 608, the flow returns to step 602 to wait for a next packet from the packet filter or a message from a gateway program which may contain a processed packet. If no packet is received from the packet filter in decision step 603, step 604 then determines whether a message is received from a gateway program. If yes, decision steps 610, 611 and 612 respectively determine whether the message is a request for starting or stopping a flow; a request for processing of forthcoming packets within the dispatcher process; or a packet itself that has been processed by a gateway program. If it is determined at step 610 that the message is a request for starting/stopping a flow, which declares the properties of packets to be received, then at step 613, the appropriate request is forwarded to the packet filter 403. If it is determined at step 611 that the message from the gateway program is a request for processing by the dispatcher of forthcoming packets, then, at step 614, the request is stored by the dispatcher process for use when the appropriate packets do arrive from the packet filter. If it is determined at step 612 that the message from the gateway program is a packet that has been processed by the gateway program, then, at step 615, the processed packet is sent to the raw IP socket 415 for injection into the network. After steps 613, 614, or 615, or after decision step 612 determines that no relevant message (a request for starting/stopping a flow; a request for processing of packets; or a packet) has been received, the flow returns to step 602 to wait for a next packet from the packet filter or a message from a gateway program.

Although the embodiment of the present invention has been described above using a Linux OS, it could also be implemented on other operating systems. As an example, the programmable network element of the present invention could be implemented on the Windows NT OS since NT allows injecting intermediate drivers between the network device drivers and the protocol stack. Such a driver could perform the packet interception and injection functions of the programmable network element, along with the packet filtering. The programmable element could thus be a software product which runs on Windows NT. Further, the present invention need not be implemented totally in software but could be implemented in hardware or a combination of hardware, software, or firmware. Specifically, as previously noted, the dispatcher process 402 could be one element of the invention that, in another embodiment, could be implemented at least in part in hardware with an advantage of high processing speed.

As previously noted, although described above as a programmable "gateway", the present invention could be positioned at essentially any point in the connection between two endpoints. As an example, a programmable network element in accordance with the present invention could be positioned as a router within the wide area network, rather than at the edge. Further, the programmable network element of the present invention can serve as a "virtual server" anywhere on the network, and can also be incorporated as software on servers or clients, acting in the latter case as a gateway between an application and the network. The use of the terms "programmable gateway" or "programmable network elements" are thus intended to include any and all such uses of the present invention in a network and should not be limited to the use of the invention as a gateway at the edge of a network in the manner described above.

The foregoing therefore merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited hereinabove are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements hereinabove reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams and flowcharts described hereinabove represent conceptual views of illustrative circuitry and processes embodying the principles of the invention. Similarly, it will be appreciated that any flowcharts, flow diagrams, state transition diagrams, pseudocode, and the like represent various processes which may be substantially represented in computer readable medium and so executed by a computer or processor, whether or not such a computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent to those shown hereinabove.

What is claimed is:

1. A network element for a packet-based computer network comprising:
   a plurality of dynamically loaded programs, each of the programs being loaded into the network element separate from packets flowing from the computer network through the network element, each of the programs comprising separate instructions for:
   (1) defining one or more characteristics that a packet flowing through the network element from the computer network has to have for the program to execute on the packet; and
   (2) manipulating the packet if it has the defined characteristics associated with that program;
   and;
   a dispatcher for:
   (1) receiving a packet having the defined characteristics associated with one or more of the plurality of programs from the packets flowing through the network element from the computer network;
   (2) operating cooperatively with each program for which the received packet has the defined characteristics associated with that program to manipulate the received packet in accordance with the instructions of that program; and
   (3) inserting the manipulated received packet back into the computer network.

2. The network element of claim 1 wherein each of the plurality of dynamically loaded programs is either a privileged program or an unprivileged program.

3. The network element of claim 2 wherein before a particular one of the dynamically loaded programs operates cooperatively with the dispatcher on a received packet having the defined characteristics associated with that program, the dispatcher verifies that a privilege level of that particular program is of a type that allows the received packet to be manipulated in accordance with the instructions of that particular program.

4. The network element of claim 1 wherein more than one of the plurality of dynamically loaded programs execute in parallel on packets in different packet flows.

5. The network element of claim 1 wherein more than one of the plurality of dynamically loaded programs execute in succession on packets in a single packet flow.

6. The network element of claim 1 wherein one or more of the plurality of programs is loaded into the network element through a program injector locally connected to the network element.

7. The network element of claim 1 wherein one or more of the plurality of programs is loaded into the network element through a program injector remotely connected over a network connection to the network element.

8. The network element of claim 1 wherein the dispatcher is a dispatcher process on a computer.

9. The network element of claim 1 wherein the dispatcher sends a received packet having the defined characteristics associated with one or more of the plurality of programs to at least one such program for manipulation.

10. The network element of claim 1 wherein the dispatcher manipulates a received packet having the defined characteristics associated with one or more of the plurality of the programs in accordance with instructions provided to the dispatcher in at least one such program.

11. The network element of claim 1 wherein one or more of the plurality of dynamically loaded programs performs packet manipulation functions from the group comprising: encrypting a packet payload, decrypting a packet payload, translating a source address of a packet, translating a destination address of a packet, web dispatching for load balancing, and firewall protection.

12. The network element of claim 1 wherein the network element is implemented on a Linux operating system.

13. The network element of claim 1 wherein the dispatcher sends only a packet header of a packet having the defined characteristics associated with one or more of the programs to at least one such program for manipulation.

14. A network element for a packet-based computer network comprising:
   means for dynamically loading a plurality of programs, said loading means loading each of the programs separately from packets flowing from the computer network through the network element, each of the programs comprising instructions for:
   (1) defining one or more characteristics that a packet flowing through the network element from the computer network has to have for the program to execute on the packet; and
   (2) manipulating the packet if is has the defined characteristics associated with that program;
   and;
   a dispatcher for:
   (1) receiving a packet having the defined characteristics associated with one or more of the plurality of programs from the packets flowing through the network element from the computer network;

(2) operating cooperatively with each loaded program for which the received packet has the defined characteristics associated with that program to manipulate the received packet in accordance with the instructions of that program; and (3) inserting the manipulated received packet back into the computer network.

15. The network element of claim 14 wherein each of the plurality of programs is either a privileged program or an unprivileged program.

16. The network element of claim 15 wherein before a particular one of the plurality of programs operates cooperatively with the dispatcher on a received packet having the defined characteristics associated with a particular program, the dispatcher verifies that a privilege level of that particular program is of a type that allows the received packet to be manipulated in accordance with the instructions of that particular program.

17. The network element of claim 14 wherein more than one of the plurality of programs execute in parallel on packets in different packet flows.

18. The network element of claim 14 wherein more than one of the plurality of programs execute in succession on packets in a single packet flow.

19. The network element of claim 14 wherein the loading means locally loads the one or more of the programs through a program injector connected to the network element.

20. The network element of claim 14 wherein the loading means remotely loads one or more of the programs through a program injector connected over a network connection to the network element.

21. The network element of claim 14 wherein the dispatcher is a dispatcher process on a computer.

22. The network element of claim 14 wherein the dispatcher sends a received packet having the defined characteristics associated with one or more different programs to at least one such program for manipulation.

23. The network element of claim 14 wherein the dispatcher manipulates a received packet having the defined characteristics associated with one or more different programs to the dispatcher in at least one such program.

24. The network element of claim 14 wherein one or more of the plurality of dynamically loaded programs performs packet manipulation functions from the group comprising: encrypting a packet payload, decrypting a packet payload, translating a source address of a packet, translating a destination address of a packet, web dispatching for load balancing, and firewall protection.

25. The network element of claim 14 wherein the network element is implemented on a Linux operating system.

26. The network element of claim 14 wherein the dispatcher sends only a packet header of a packet having the defined characteristics associated with at least one of the plurality of programs to that program for manipulation.

27. The network element of claim 14 wherein the network element is implemented as software running on a client.

28. The network element of claim 14 wherein the network element is implemented as software running on a server.

29. The network element of claim 14 wherein the network element functions as a router.

30. The network element of claim 14 wherein the network element functions as a network gateway.

31. A method for manipulating a packet transmitted on a packet-based computer network at a network element through which packets transmitted on the computer network flow, the method comprising the steps of:

receiving the packet;

determining, for each of a plurality of programs dynamically loaded into the network element separately from packets transmitted on the computer network, whether the packet has one or more associated program-defined characteristics that the packet has to have for the program to execute on the packet;

manipulating the received packet in accordance with instructions of each of the programs for which the packet has the defined characteristics associated with that program; and inserting the manipulated packet back into the computer network.

32. The method of claim 31 wherein each of the plurality of programs is either a privileged program or an unprivileged program.

33. The method of claim 32 wherein prior to the step of manipulating a received packet, the method further comprises the step of verifying that a privilege level of a program that is executing on the packet is of a type that allows the received packet to be manipulated in accordance with the instructions of that program.

34. The method of claim 31 wherein more than one of the plurality of programs execute in parallel on packets in different packet flows.

35. The method of claim 31 wherein more than one of the plurality of programs execute in succession on packets in a single packet flow.

36. The method of claim 31 further comprising the step of loading one or more of the programs into the network element through a program injector locally connected to the network element.

37. The method of claim 31 further comprising the step of loading one or more of the programs into the network element through a program injector remotely connected over a network connection to the network element.

38. The method of claim 31 wherein the method is implemented as a process in a series of instructions in a computer.

39. The method of claim 31 further comprising the step of sending a packet determined to have the defined characteristics associated with one or more of the programs to at least one such program, wherein the step of manipulating the packet is performed by that program.

40. The method of claim 31 wherein the step of manipulating the packet is performed outside at least one of the plurality of programs in accordance with instructions of the program.

41. The method of claim 31 wherein one or more of the plurality of programs provides instructions for manipulating the packet to perform packet manipulation functions from the group comprising: encrypting a packet payload, decrypting a packet payload, translating a source address of a packet, translating a destination address, web dispatching for load balancing, and firewall protection.

42. The method of claim 31 wherein the method is implemented using a Linux operating system.

43. A computer readable medium storing computer program instructions which are executable on a computer system implementing a network element through which packets transmitted on a packet-based computer network flow, said computer program instructions comprising instructions defining the steps of:

determining for each of a plurality of gateway programs loaded into said computer program separate from packets transmitted on the computer network, whether a received packet from the computer network has one or more defined characteristics that the packet has to have for the gateway program to execute on the packet; and manipulating the received packet in accordance with instructions of each of the gateway programs for which the packet has the defined characteristics associated with that gateway program.

44. The computer readable medium of claim 43 wherein each of the plurality of gateway programs is either a privileged gateway program or an unprivileged gateway program.

45. The computer readable medium of claim 44 wherein prior to the step of manipulating the received packet in accordance with the instructions of the particular gateway program, the computer instructions further comprise the step of verifying that a privilege level of a gateway program that is executing on the packet is of a type that allows the packet to be manipulated in accordance with the instructions of that gateway program.

46. The computer readable medium of claim 43 wherein more than one of the plurality of gateway programs are executable in parallel on packets flowing through the network element when the packets in different packet flows.

47. The computer readable medium of claim 43 wherein more than one of the plurality of the plurality of the gateway programs are executable in succession on packets in a single packet flow.

48. The computer readable medium of claim 43 wherein one or more of the gateway programs are loaded through a program injector locally connected over a network connection to the computer system.

49. The computer readable medium of claim 43 wherein one or more of the gateway programs are loaded through a program injector remotely connected to the computer system.

50. The computer readable medium of claim 43 wherein the step of manipulating the received packet is performed by one or more of the gateway programs.

51. The computer readable medium of claim 43 wherein the step of manipulating the received packet is performed outside one or more of the gateway programs in accordance with the instructions of the gateway program.

* * * * *